Figure 1:
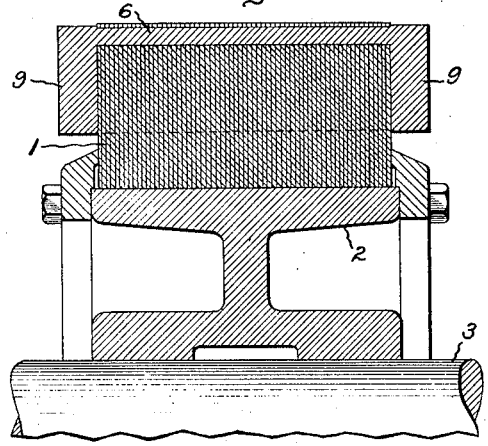

Sept. 22, 1925.

S. R. BERGMAN

INDUCTION MOTOR

Filed Nov. 29, 1924

1,554,702

Inventor:
Sven R. Bergman
by *Alexander S. [illegible]*
His Attorney.

Patented Sept. 22, 1925.

1,554,702

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

INDUCTION MOTOR.

Application filed November 29, 1924. Serial No. 752,994.

*To all whom it may concern:*

Be it known that I, SVEN R. BERGMAN, a subject of the King of Sweden, residing at Nahant, in the county of Essex, State of Massachusetts, have invented certain new and useful Improvements in Induction Motors, of which the following is a specification.

My invention relates to induction motors and particularly to such motors of the squirrel cage type.

It is well known that in order that an induction motor should start under load without an excessive current flow, it is necessary that the secondary circuit shall possess a high resistance, and on the other hand, that when the motor is up to speed the resistance and the reactance of the secondary circuit should be low in order to secure efficient operation.

It has been proposed heretofore to provide the secondary member of an induction motor with two squirrel cage windings, one of high resistance and low reactance and the other of low resistance and high reactance. When starting with such an arrangement, the frequency of the secondary currents is high and the high resistance windings will carry the greater part of the load, but when the motor is up to speed, the frequency of the secondary currents is low and the low resistance winding will carry the load.

My invention relates to induction motors of the above described type and has for its object, a novel construction and arrangement of parts, whereby such motors have a better starting torque, and a higher efficiency and very slightly lower power factor at normal speeds, than ordinary squirrel cage induction motors, and better characteristics than double squirrel cage induction motors as heretofore constructed.

To this end, my invention consists in providing the rotor with conducting elements placed in alternately deep and shallow slots forming teeth therebetween of substantially uniform cross section, the conducting elements in the shallow slots and the conducting elements in the top of the deep slots being connected together to form a high resistance, low reactance squirrel cage winding and the conducting elements in the bottom of the deep slots being connected together to form a low resistance high reactance squirrel cage winding.

By making the teeth of substantially uniform cross-section between the deep and shallow slots, I obtain uniform density in the rotor teeth. In this way the magnetic material is most efficiently utilized. Furthermore with my construction, both windings are of comparatively low reactance because the conductors in the deep slots have little leakage flux crossing them. Nevertheless the winding formed of the conductors in the shallow slots and the conducting elements in the top of the deep slots, which is of high resistance, is of somewhat lower reactance than the other winding because practically no flux crosses it. The winding formed of the conducting elements in the bottom of the deep slots, however, since it is of large cross-section, is of low resistance and it has higher reactance than the other winding, since, when the motor is starting, flux will leak across the deep slots above the conducting elements of large cross section and little flux will pass under these slots. A motor provided with two such windings, therefore, has a better starting torque and a higher efficiency and only slightly lower power factor at normal speed than an ordinary squirrel cage motor and better characteristics in all respects than double squirrel cage motors as heretofore constructed.

Figure 2:
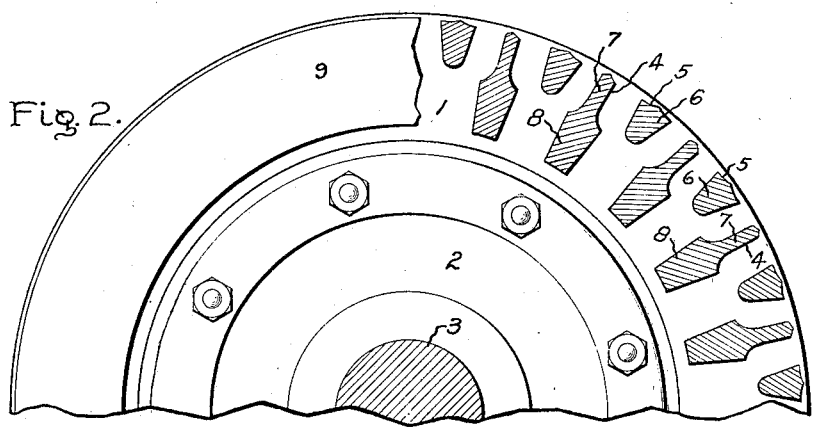

For a better understanding of my invention and other features of novelty, reference may be had to the following specification taken in connection with the accompanying drawings, in which Fig. 1 shows an end view, partly in section, of a portion of the rotor of an induction motor arranged in accordance with my invention, and Fig. 2 shows a cross-sectional view of the portion of the rotor of Fig. 1.

In the drawing, 1 represents the rotor core which is built up of laminations mounted on a spider 2, the spider being mounted on a shaft 3 in the usual manner. The rotor core is provided with alternately deep slots 4 and shallow slots 5. The shallow slots 5 have a single conducting element 6 therein, whereas the deep slots 4 have two conducting elements therein, one, 7, in the top thereof and the other, 8, in the bottom thereof. All of the conducting elements in all the slots are shown as being connected together at the ends by short-circuiting or end rings 9, one at each end of the rotor core. The conducting elements 6 in the shallow slots and the conducting elements 7 in the top of the deep slots are connected together to form a high resistance, low reactance squirrel cage winding and the conducting elements 8 in the bottom of the deep slots are connected together to form a low resistance, high reactance squirrel cage winding. As will be seen from the drawing, the teeth 10 formed between the deep and shallow slots are substantially uniform in cross-section, whereby uniform magnetic density in the teeth is obtained. In the particular arrangement shown in the drawing, the deep slots are narrower in that portion thereof near the periphery of the rotor than the shallow slots, and thereby there is provided a small air gap across which the flux will pass when the motor is starting, little flux passing underneath the deep slots thus the winding composed of the conducting elements in the bottom of the deep slots has a higher reactance than the winding composed of the conducting elements in the top of the deep slots and the conductors in the shallow slots. The teeth are made uniform in cross-section by providing the narrow portion of the deep slots with substantially parallel sides, which are substantially parallel with the sides of the shallow slots, and the cross-section of each of the teeth between the bottom of said deep slots is substantially double that of the cross-section of a tooth between the portion of a deep slot near the periphery of the rotor and a shallow slot, whereby the magnetic density throughout the depth of the rotor teeth is substantially uniform. The bottom portions of the deep slots, that is, the portions of these slots further away from the periphery of the rotor, are wider than the top portions.

In practice, I find it advantageous to cast the conductor portions 6, 7 and 8 and the end rings 9 as a unitary structure. This may be done in any suitable manner but I prefer to employ the method is illustrated in the Reist & Maxwell Patent No. 1,190,009, dated July 4, 1916. By casting the windings, the conducting elements 7 and 8 in each of the deep slots are formed as a single conductor and completely fills such slot.

What I claim as new and desire to secure by Letters Patent of the United States, is:—

1. In an induction motor a rotor provided with alternately deep and shallow slots forming teeth therebetween, conducting elements in said slots, said conducting elements in said shallow slots and said conducting elements in the top of said deep slots being connected together to form a high resistance low reactance squirrel cage winding, said conducting elements in the bottom of said deep slots being connected together to form a low resistance high reactance squirrel cage winding, said teeth being of substantially uniform cross-section between said deep and shallow slots whereby the magnetic density in said teeth is uniform.

2. In an induction motor a rotor provided with alternately deep and shallow slots forming teeth therebetween, a single conducting element in said shallow slots, a plurality of conducting elements in said deep slots, one in the top of said deep slots and one in the bottom thereof, said conducting elements in said shallow slots and said conducting elements in the top of said deep slots being connected together to form a high resistance low reactance squirrel cage winding, said conducting elements in the bottom of said deep slots being connected together to form a low resistance high reactance squirrel cage winding, said teeth being of substantially uniform cross-section between said deep and shallow slots whereby the magnetic density in said teeth is uniform.

3. In an induction motor a rotor provided with alternately deep and shallow slots forming teeth therebetween, conductors substantially filling said slots, said conductors in said deep slots having a plurality of conducting elements, one in the top of said slots and one in the bottom of said slots, said conductors in said shallow slots and said conducting elements in the top of said deep slots being connected together to form a high resistance low reactance squirrel cage winding, said conducting elements in the bottom of said deep slots being connected together to form a low resistance high reactance squirrel cage winding, said teeth being of substantially uniform cross-section between said deep and shallow slots whereby the magnetic density in said teeth is substantially uniform.

4. In an induction motor a rotor provided with alternately deep and shallow slots forming teeth therebetween, a conductor in each of said slots substantially filling the same, and rings connecting all of said conductors together so as to form a plurality of squirrel cage windings, one of said squirrel cage windings comprising the conductors in said shallow slots and the conducting elements in the top of said deep slots and the other of said squirrel cage windings comprising the conductor elements in the bottom of said deep slots, said teeth being of substantially uniform cross-section between said deep and shallow slots whereby the magnetic density in said teeth is uniform.

5. In an induction motor a rotor provided with alternately deep and shallow slots forming teeth therebetween, said deep slots being narrow in that portion thereof near the periphery of the rotor and having substantially parallel sides in this portion thereof, the portions of said slots further away from said peripheral being wider than the first mentioned portions of the slots, a conductor in each of said slots substantially filling the same, and rings connecting all of said conductors together so as to form a plurality of squirrel cage windings, one of said squirrel cage windings comprising the conductors in said shallow slots and the conducting elements in the top of said deep slots and the other of said squirrel cage windings comprising the conductor elements in the bottom of said deep slots, said teeth being of substantially uniform cross-section between said deep and shallow slots whereby the magnetic density in said teeth is uniform.

6. In an induction motor a rotor provided with alternately deep and shallow slots forming teeth therebetween, conducting elements in said slots, said conducting elements in said shallow slots and said conducting elements in the top of said deep slots being connected together to form a high resistance low reactance squirrel cage winding, said conducting elements in the bottom of said deep slots being connected together to form a low resistance high reactance squirrel cage winding, said teeth being of substantially uniform cross-section between said deep and shallow slots and the cross-section of each of the teeth between the bottom of said deep slots being substantially double that of the cross-section of a tooth between the top part of a deep slot and a shallow slot.

7. In an induction motor a rotor provided with alternately deep and shallow slots forming teeth therebetween, conductors substantially filling said slots, said conductors in said deep slots having a plurality of conducting elements, one in the top of said slots and one in the bottom of said slots, said conductors in said shallow slots and said conducting elements in the top of said deep slots being connected together to form a high resistance low reactance squirrel cage winding, said conducting elements in the bottom of said deep slots being connected together to form a low resistance high reactance squirrel cage winding, said teeth being of substantially uniform cross-section between said deep and shallow slots and the cross-section of each of the teeth between the bottom of said deep slots being substantially double that of the cross-section of a tooth between the top part of a deep slot and a shallow slot.

8. In an induction motor, a rotor provided with alternately deep and shallow slots forming teeth therebetween, said deep slots being narrower in those portions thereof near the periphery of the rotor than the shallow slots, said portions of the deep slots having substantially parallel sides, the portions of said deep slots further away from said peripheral being wider than the first mentioned portions of said deep slots, a conductor in each of said slots substantially filling the same, and rings connecting all said conductors together so as to form a plurality of squirrel cage windings, one of said squirrel cage windings comprising the conductors in said shallow slots and the conducting elements in the top of said deep slots and the other of said squirrel cage windings comprising the conductor elements in the bottom of said deep slots, said teeth being of substantially uniform cross-section between said deep and shallow slots whereby the magnetic density in said teeth is uniform.

9. In an induction motor, a rotor provided with alternately deep and shallow slots forming teeth therebetween, said deep slots being narrower in those portions thereof near the periphery of the rotor than the shallow slots, said portions of the deep slots having substantially parallel sides, the portions of said slots further away from said peripheral being wider than the first mentioned portions of said deep slots, a conductor in each of said slots substantially filling the same, and rings connecting all of said conductors together so as to form a plurality of squirrel cage windings, one of said squirrel cage windings comprising the conductors in said shallow slots and the conducting elements in the top of said deep slots and the other of said squirrel cage windings comprising the conductor elements in the bottom of said deep slots, said teeth being of substantially uniform cross-section between said deep and shallow slots and the cross-section of each of the teeth between the bottom of said deep slots being substantially double that of the cross-section of a tooth between the portion of a deep slot near the periphery of the rotor and a shallow slot.

In witness whereof, I have hereunto set my hand this 26th day of November 1924.

SVEN R. BERGMAN.